United States Patent Office 3,006,829
Patented Oct. 31, 1961

3,006,829
PROCESS FOR TREATING LINEAR POLYPROPYLENE
Paul M. Cook, Menlo Park, James B. Meikle, Palo Alto, and Bruce Graham, Los Altos, Calif., assignors, by mesne assignments, to W. R. Grace & Co., New York, N.Y., a corporation of Connecticut
No Drawing. Filed Mar. 15, 1956, Ser. No. 571,610
14 Claims. (Cl. 204—154)

This invention relates to the production of plastic materials and has particular reference to the treatment of linear plastics such as polyethylene, polymethylene and polypropylene by irradiation to improve the physical and chemical properties thereof.

One of the principal objects of this invention is to provide a novel process for the treatment of linear plastics by ionizing irradiation.

Another object of this invention is to provide a novel irradiation process for the treatment of linear polymers of ethylene, methylene and propylene to produce new and improved plastic materials therefrom.

Another object of this invention is to provide a novel process for the treatment of linear polyethylene, polymethylene, and polypropylene to increase the heat resistance thereof.

The present invention is an improvement over that described and claimed in the copending application of Cook et al., Serial No. 532,805, filed September 6, 1955, on "Process for Treating Plastics and Products Thereof," now Patent No. 2,960,453. As stated therein, it is now well known that certain properties of resinous materials such as the thermoplastics and the precursors of thermosetting resins (i.e., monomers and linear low polymers) are improved by moderate doses of high energy radiation of the order of $1 \times 10^6$ to $1 \times 10^8$ rep. (Roentgens equivalent physical). Such treatment is believed to result in cross-linking of the polymerized chains which make up the resin. In those plastics containing carbon chains, a related chemical effect, i.e., the formation of double bonds, is also believed to be produced.

The linear polyethylenes, polymethylenes and polypropylenes (high temperature, M.P. 120–135° C.) are among the resinous materials which are known to be improved by moderate doses, i.e., $1 \times 10^6$ rep. to $1 \times 10^8$ rep. (Roentgens equivalent physical), and these materials are rendered non-melting or thermosetting by doses in the range of $1 \times 10^7$ rep. or somewhat higher. However, long exposure (72 hours or longer) of these materials to temperatures in the range of 150° C. or slightly higher causes the irradiated materials to slowly deform, then flow, darken and break apart. One of the important objects of this invention is to provide processes and compositions in which this objectionable lack of heat resistance is overcome.

Another, more specific object of this invention is to provide an improved process for irradiating linear polyethylenes, polymethylenes and polypropylenes in which is utilized an agent which induces cross-linking or actually becomes a part of the cross-linking bridge.

Still another object of this invention is to provide a novel process for the production of cellular (foamed) and non-cellular linear polyethylenes, polymethylenes and polypropylenes.

Other objects and advantages of this invention it is believed will be readily apparent from the following detailed description of preferred embodiments thereof.

Briefly, this invention comprehends within its scope the discovery that certain physical properties, particularly heat-resistance, of linear polyethylenes, polymethylenes and polypropylenes subjected to high energy radiation are improved by carrying out the irradiation in the presence of sulfur, selenium, tellurium and compounds containing these elements. These elements and compounds are generically referred to herein as "bridging agents." Although the mechanism or mechanisms by which these bridging agents produce this new and unexpected result are not completely understood, it is believed that in some manner they induce or enhance the cross-linking effect which is generally believed to result from conventional irradiation treatments, and further it is believed that the sulfur, selenium or tellurium and/or the molecular moieties containing these elements actually becomes or become a part of the cross-linking bridge. In carrying out the process, vulcanization accelerators such as the mercapto-thiozoles, thiuram sulfides, guanidines, selenium diethyl dithiocarbamate, and amine-aldehyde reaction products may be added to the resin. The sulfur- and selenium-containing accelerators, such as the thiuram sulfides, also function as vulcanizing or cross-linking agents. Additionally, conventional anti-oxidants may be added such as, for example, diphenyl-p-phenylenediamine, Ionol, phenyl-α-naphthylamine, diarylamine, 2,2'-methylene bis (3-methyl-6-t-butylphenol) and ketone reaction products of arylamines.

The compositions of this invention are made by melting linear polyolefins such as commercial linear polyethylenes, M.P. 125–129° C., linear polymethylenes or linear polypropylenes and mixing therewith one or more of the additives specifically set forth below. These linear polymers are made at relatively low temperatures and pressures as compared to the conditions employed in polymerizing conventional, branched polyethylene. Examples of linear polyethylenes are: (1) "Marlex," supplied by Phillips Chemical Corporation, a material alleged to be polymerized by a heat-activated chrome oxide catalyst on a silica aluminum support, at about 500 pounds per square inch pressure and a temperature of 135–190° C.; (2) "Super Dylan," supplied by the Koppers Company, a material alleged to be polymerized by the Ziegler method wherein a triethyl aluminum catalyst containing a titanium tetrachloride activator is utilized, at temperatures from 60° to 250° C. and at pressures ranging from atmospheric to 2000 atmospheres; and (3) any of the other commercial linear polyethylenes, such as "Hastalen," supplied by Farbwerke Hoechst A.G. of Frankfurt, Germany.

The additives or combinations of additives useful as bridging agents in the compositions of this invention are elemental sulfur, selenium and tellurium, and compounds containing these elements, usually in their lower valence states or covalence states. Compounds which liberate sulfur, selenium or tellurium during irradiation or during heat aging (100 to 200° C.) are useful. Polymers containing sulfur, selenium or tellurium and/or monomers capable of forming such polymers are also useful. Conventional rubber vulcanizing agents and vulcanizing accelerators are particularly adapted to this application. Specific compounds that yield improved polymers are: mercapto thiazoles, such as 2-mercaptobenzothiozole and its salts, for example its zinc salt; thiuram sulfides, such as tetraethylthiuram monosulfide and tetrabutylthiuram monosulfide; guanidines, thiourea, substituted thioureas, thiocarbanilides, substituted thiocarbamilides such as o-dimethylthiocarbanilide and its isomers and alkyl homologs; zinc dialkyl dithiocarbamates such as zinc dimethyl dithiocarbamate, zinc diethyldithiocarbamate, zinc dibutyl dithiocarbamate, and zinc dibenzyl dithiocarbamate or accelerators containing these materials, thiurams such as tetramethylthiuram disulfide, tetraethylthiuram disulfide, and other tetra substituted thiuram disulfides; selenium dialkyl dithiocarbamates such as selenium diethyldithiocarbamate; 2-benzothiazyl-N,N-diethylthiocarbamyl sulfide; sodium or potassium dimethyl-dithiocarbamate;

xanthates such as dibutyl xanthogen disulfide and Naugatuck Chemical's CPB and ZBX; alkyl phenol sulfides; bus(dimethylthiocarbamyl) disulfide, dipentamethylene tetrasulfide; and sulfur containing polymers such as Thiokol VA-3, 4,4-dithiomorpholine and disulfides such as benzothiazyl disulfide. In fact, any compound in which sulfur, selenium or tellurium is attached only to an atom of carbon, hydrogen, nitrogen or to another sulfur, selenium or tellurium atom, as the case may be, would be suitable.

In addition to the above additives are the sulfonyl hydrazides and disulfonyl hydrazides. The latter are particularly useful since they contain two widely separated sulfur-bearing moieties capable of forming sulfur cross-links or free radical derived cross-linkages (as a result of thermal loss of nitrogen). Commercial blowing agents such as p,p'-oxybis (benzene sulfonyl hydride), p,p'-diphenyl bis(sulfonyl hydrazide) and m-benzene-bis(sulfonyl hydrazide) are examples of additives which also function in the compositions of this invention as precursors of bridging agents. The blowing agents can be mixed into the molten polyethylene and be blown during the mixing if an unfoamed polymer is desired. If a foamed material is the desired product, the mixture is blown in the shape, form or situation in which it is to be used. The cross-linking agents which are not also blowing agents are simply mixed into the molten plastic. The additives can be used in concentrations of from about 0.05 to about 10%, but preferably in the range of from about 0.10 to about 5%.

Once the compositions are made, they are molded or otherwise put into final form before irradiation. The irradiations may be accomplished with any of a wide variety of ionizing or high energy sources such as radioactive materials, gamma-ray sources, Van de Graaff accelerators, resonance transformer type cathode ray machines, linear electron beam accelerators, atomic piles, X-ray machines, betatrons, neutron sources, etc. The radiation dose may be varied according to the physical properties desired for the final product. Generally doses from $1 \times 10^5$ to $1 \times 10^9$ are feasible but the range between $1 \times 10^6$ and $1 \times 10^8$ is most practical and useful.

The irradiations can be carried out at room temperature or at elevated temperatures. Once the plastics have been cross-linked sufficiently to prevent melting, the temperature can be raised to 150° C. or higher if protection from oxidation is provided.

Once the formulated, molded and irradiated plastics are obtained, their properties can be changed appreciably by heat aging or annealing. Since the principal advantage of irradiation of polyethylene is the resultant gain in heat resistance, the behavior of the materials at elevated temperatures, particularly over long periods of time, is especially significant. Conventional irradiated linear polyethylenes are satisfactory at temperatures up to 120° C. or even up to 150° C. for limited times. However, after 96 to 120 hours at 150° in air, "Marlex" irradiated with beta rays from a 1 mev. machine at a maximum rate of 70,000,000 reps./min. tends to break apart, melt and become worthless, while similarly treated materials containing additives in accordance with this invention retain their valuable properties such as tensile strength to an appreciable degree.

The following specific examples are illustrative of the process and composition of this invention, but it is to be understood that the invention is not to be limited thereto:

EXAMPLE 1

Linear polyethylene (Phillips Chemical Company's "Marlex"), two hundred ninety seven parts, was blended at 450–475° F. with three parts by weight of zinc diethyl dithiocarbamate in a Davis-Standard Extruder. When mixing was complete, the plastic was extruded on 25 mil wire to yield a coated wire averaging 55 mils in diameter containing 1% of the additive. The wire was cooled at room temperature and irradiated in the beam of a 1-mev. General Electric resonance transformer type cathode ray machine at a maximum rate of 70 million reps. per minute. The irradiation was carried out at approximately room temperature as the samples were cooled by air to prevent appreciable temperature rise. The metal wire was stripped from the insulation and discarded. The insulation in 10" lengths was used for physical property and heat aging studies, the results of which are set forth in the following table. The heat aging described in the table was carried out in a typical laboratory hot-air oven.

EXAMPLE 2

The 0.2% samples of the table were prepared as in Example 1, except that the ratio of additive to polyethylene was two parts to 998 parts by weight, respectively.

*Properties of control versus formulated linear polyethylene, irradiated with beta rays and heat aged in air*

| Percent Additive | Radiation Dose×10⁶ Roentgens | Tensile Strength, p.s.i. | | | Heat Aged 96 hrs. at 150° C. | | | |
|---|---|---|---|---|---|---|---|---|
| | | Not Aged | Aged 1 hr. at 150° C. | Aged 120 hrs. at 150° C. | Flexibility | Shrinkage | Distortion | Color |
| None | None | 3,030 | Melted | Melted | | Complete | Immediate | |
| 0.2 | None | 3,400 | do | do | | Melted | | |
| 0.1 | None | 3,180 | do | do | | do | | |
| None | 10 | 3,120 | 3,160 | do | Poor | Extensive | Extensive | Yellow. |
| None | 25 | 3,470 | 2,980 | do | | Melted | slowly | White. |
| None | 50 | 3,560 | 2,670 | do | | do | do | Brown. |
| 0.2 | 10 | 3,225 | 3,270 | Broke | Poor | Extensive | Extensive | Yellow. |
| 0.2 | 25 | 3,415 | 2,850 | 1,525 | Good | Some | Little | Cream. |
| 0.2 | 50 | 3,880 | 2,930 | 1,570 | Excellent | Little | None | Brown. |
| 1.0 | 10 | 3,315 | 3,130 | Broke | Poor | Extensive | Some | Yellow. |
| 1.0 | 25 | 3,585 | 2,820 | 1,300 | Good | Little | Little | Do. |
| 1.0 | 50 | 3,910 | 2,890 | 1,875 | Excellent | do | None | Brown. |

The cellular irradiated materials are of value not only in the form of wire and cable insulation and jacketing but in coaxial cables, and many pre-formed articles which can be irradiated and which can be advantageously made of cellular organic polymers that possess excellent electrical properties, heat stability, tensile strength and elasticity. Examples of such articles are foamed-in-place insulation for many types of electrical components both single and unitized, for instance, terminal strips, printed circuits, and potted assemblies made up of resistors, transformers, condensers, diodes, etc. The cards or chassis of radio systems may also be made of such light-weight insulating material. Superior insulating materials can be manufactured by irradiating sheets of the cellular plastics. These sheets can then be cut and fitted to areas needing insulation, either electrical or thermal. Articles requiring foamed-in-place thermal insulation can be fabricated and then irradiated to produce high heat stability insulation. Foamed tapes designed for wrapped electrical and/or thermal insulation can be manufactured by the process of this invention.

The irradiation improves not only the pure plastics mentioned above but also these materials in filled form, pigmented form, light stabilized form, in forms stabilized toward oxidation. Fillers which are themselves damaged by irradiation are excluded from the filled plastics mentioned above.

The irradiation of the cellular plastics is in effect an upgrading of useful materials with limited thermal properties to those of considerably improved thermal properties. The economic values of the materials is increased considerably in the process.

The non-cellular irradiated plastics are of use in practically all of the applications ordinarily made of the parent plastics from which the blends are derived. However, the molded articles must be irradiated in their molded form. This extra processing step makes the materials more thermosetting, more heat resistant, generally stronger, and more resistant to flow and distortion at high temperature. This upgrading in physical properties is significant in many applications of the plastics, especially in the electronics, electrical and nuclear energy fields.

The cellular sheets and blocks which are blown after irradiation are useful as thermal and electrical insulating materials and as general materials of construction.

Having fully described our invention, it is to be understood that we do not wish to be limited to the details set forth, but our invention is of the full scope of the appended claims.

We claim:

1. A process for the treatment of linear polypropylene comprising incorporating in said linear polypropylene a minor amount of a member selected from the group consisting of rubber accelerators and vulcanizing agents containing an element selected from the group consisting of sulphur, selenium and tellurium and a sulfonyl hydrazide, and exposing said linear polypropylene to high energy ionizing radiation to a dosage of at least $1 \times 10^6$ rep.

2. A process according to claim 1 wherein the irradiation is carried out to a dosage of between $1 \times 10^6$ rep. and $1 \times 10^8$ rep.

3. A process according to claim 1 wherein the member is elemental sulphur.

4. A process according to claim 1 wherein the member is a sulfonyl hydrazide.

5. A process according to claim 1 in which the sulfonyl hydrazide is a bis-sulfonyl hydrazide.

6. A process according to claim 1 wherein the bis-sulfonyl hydrazide is p,p'-oxy bis(benzene sulfonyl hydrazide).

7. A process for the treatment of linear polypropylene comprising incorporating in said linear polypropylene a minor proportion of a sulphur containing blowing agent, and exposing said linear polypropylene to high energy ionizing radiation to a dosage of at least $1 \times 10^6$ rep.

8. A process according to claim 7 wherein the polypropylene containing the blowing agent is heated to a blowing temperature to form a cellular material and the cellular material is exposed to the high energy ionizing radiation.

9. A process according to claim 1 wherein the polypropylene is melted before being admixed with the member and the molten mixture is subjected to the high energy radiation.

10. A process according to claim 9 wherein the member is sulphur.

11. A process according to claim 9 wherein the member is a sulfonyl hydrazide.

12. A process for the treatment of linear polypropylene comprising incorporating in said linear polypropylene a minor proportion of a sulphur containing blowing agent, heating the linear polypropylene to a temperature above the blowing temperature to remove gaseous products of the blowing reaction, resulting in a non-foamed product and thereafter exposing the linear polypropylene to high energy ionizing radiation in an amount of at least $1 \times 10^6$ rep.

13. A process according to claim 12 wherein the blowing agent is a disulfonyl hydrazide.

14. A process according to claim 1 wherein the irradiation dosage is applied at a rate of at least $9 \times 10^5$ roentgens per hour.

References Cited in the file of this patent

UNITED STATES PATENTS

| | | |
|---|---|---|
| 1,906,402 | Newton | May 2, 1933 |
| 2,519,755 | Gribbins | Aug. 20, 1950 |
| 2,668,133 | Brophy et al. | Feb. 2, 1954 |
| 2,727,879 | Vincent | Dec. 20, 1955 |

FOREIGN PATENTS

| | | |
|---|---|---|
| 4,110 | Australia | 1954 |

OTHER REFERENCES

Gehman et al.: Rubber World, vol. 130, pp. 643–646, August 1954.

Hunter et al.: Ind. and Eng. Chem., vol. 44, pp. 119–122 (1952).

Bopp et al.: ORNL 1373, pp. 14, 15 and 19. July 23, 1953.

Mincher: KAPL–731, pp. 5–7, April 2, 1952. Declassified Feb. 15, 1955.

Synopsium on "Utilization of Radiation From Fission Products," Horwell, AERE, C/R 1231, pp. 115–116, Feb. 23–24, 1953.

Bockhoff: "Chem. Engrg.," vol. 62, pp. 228, 230, 232, 234, September 1955.

Sissman et al.: ORNL 928, pp. 9–14, 16, 18 and 78–82, June 29, 1951.

Modern Plastics, vol. 31, pp. 100, 101, 219, April 1954.

Charlesby: "Nucleonics," pp. 18–25, June 1954.